(12) United States Patent
Peng et al.

(10) Patent No.: US 7,358,457 B2
(45) Date of Patent: Apr. 15, 2008

(54) NOZZLE FOR LASER NET SHAPE MANUFACTURING

(75) Inventors: Zhixue Peng, Nanjing (CN); Magdi Naim Azer, Niskayuna, NY (US); Yanmin Li, Shanghai (CN); Xiaobin Chen, Shanghai (CN); Xiaoping Huang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/360,107

(22) Filed: Feb. 22, 2006

(65) Prior Publication Data

US 2007/0193981 A1 Aug. 23, 2007

(51) Int. Cl.
*B23K 26/34* (2006.01)
*B23K 26/14* (2006.01)

(52) U.S. Cl. .......................... 219/121.63; 219/121.64; 219/121.84

(58) Field of Classification Search ........... 219/121.63, 219/121.64, 121.84, 121.11, 121.15, 121.47; 118/723 CB, 723 EB
See application file for complete search history.

(56) References Cited

U.S. PATENT DOCUMENTS

| | | | |
|---|---|---|---|
| 5,245,155 A | 9/1993 | Pratt et al. | |
| 5,321,228 A | 6/1994 | Krause et al. | |
| 5,418,350 A * | 5/1995 | Freneaux et al. | 219/121.84 |
| 5,477,026 A * | 12/1995 | Buongiorno | 219/121.84 |
| 5,837,960 A * | 11/1998 | Lewis et al. | 219/121.63 |
| 5,961,862 A * | 10/1999 | Lewis et al. | 219/121.84 |
| 6,046,426 A * | 4/2000 | Jeantette et al. | 219/121.63 |
| 6,534,745 B1 | 3/2003 | Lowney | |
| 6,881,919 B2 | 4/2005 | Pyritz et al. | |
| 2005/0056628 A1* | 3/2005 | Hu | 219/121.84 |
| 2006/0065650 A1* | 3/2006 | Guo | 219/121.84 |

FOREIGN PATENT DOCUMENTS

WO  WO 00/28151  5/2000

\* cited by examiner

*Primary Examiner*—Geoffrey S. Evans
(74) *Attorney, Agent, or Firm*—Richard A. DeCristofaro; Patrick K. Patnode (57) ABSTRACT

Methods, apparatuses, devices, and/or systems for laser net shape manufacturing may make use of a nozzle that includes a main body with a thermal channel, a conducting channel and a gas distribution head. The thermal channel is at least partially within the main body and includes an aperture for passing thermal energy therethrough. The conducting channel includes a conducting outlet aperture that is a located adjacent to the thermal outlet aperture, and powder material can be passed through the conducting outlet aperture. The gas distribution head is capable of distributing shielding gas in a distribution path surrounding the conducting outlet aperture.

32 Claims, 6 Drawing Sheets

NOZZLE FOR LASER NET SHAPE MANUFACTURING

BACKGROUND

Metallic parts may be modified and/or manufactured through a laser net shape manufacturing processes known as laser cladding or laser consolidation. Laser cladding may be performed to enhance the surface properties of machine parts locally with powder or wires melted via a laser beam. Likewise, laser consolidation is a similar process but with a different objective. Laser consolidation involves manufacturing a part through depositing multiple layers of material.

In laser cladding and/or consolidation, a laser beam creates a molten pool on a substrate into which powder is deposited in a beam/powder interaction zone. Concurrently, the substrate on which the deposition is occurring is moving with respect to the beam/powder interaction zone to fabricate the desired cross-sectional geometry. Consecutive layers may be additively deposited, thereby producing a three-dimensional part.

However, current techniques and/or devices used for laser net shape manufacturing may produce varying results, based on one or more factors such as: the beam size, powder concentration, powder velocity, shielding gas flow shape, shielding gas flow speed, and the defocus of the laser beam.

BRIEF DESCRIPTION OF DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Additionally, reference is made in the following detailed description to the accompanying drawings which form a part hereof wherein like numerals may designate like parts throughout, and in which is shown by way of illustration specific embodiments that may be realized. It is to be understood that other embodiments may be utilized and structural and/or logical changes may be made without departing from the scope of the claimed subject matter. It should also be noted that directions and references, for example, up, down, top, bottom, and so on, may be used to facilitate the discussion of the drawings and are not intended to restrict the application of the claimed subject matter. Therefore, the following detailed description is not to be taken in a limiting sense and the scope of the claimed subject matter defined by the appended claims and their equivalents.

Reference throughout this specification to "one embodiment" or "an embodiment" means that a particular feature, structure, or characteristic described in connection with the embodiment is included in at least one embodiment of the claimed subject matter. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Devices, such as powder feed nozzles used in laser net shape manufacturing have numerous scientific and/or industrial applications. For example, laser net shape manufacturing may be used for turbine blade airfoil repair, initial article manufacture from a concept design, and/or surface strengthening of an object, etc. Here, the term laser net shape manufacturing refers to laser cladding, laser consolidation, and/or other laser deposition techniques, for example, although other types of laser net shape manufacturing may alternatively be employed depending on the particular context.

Figure 1:
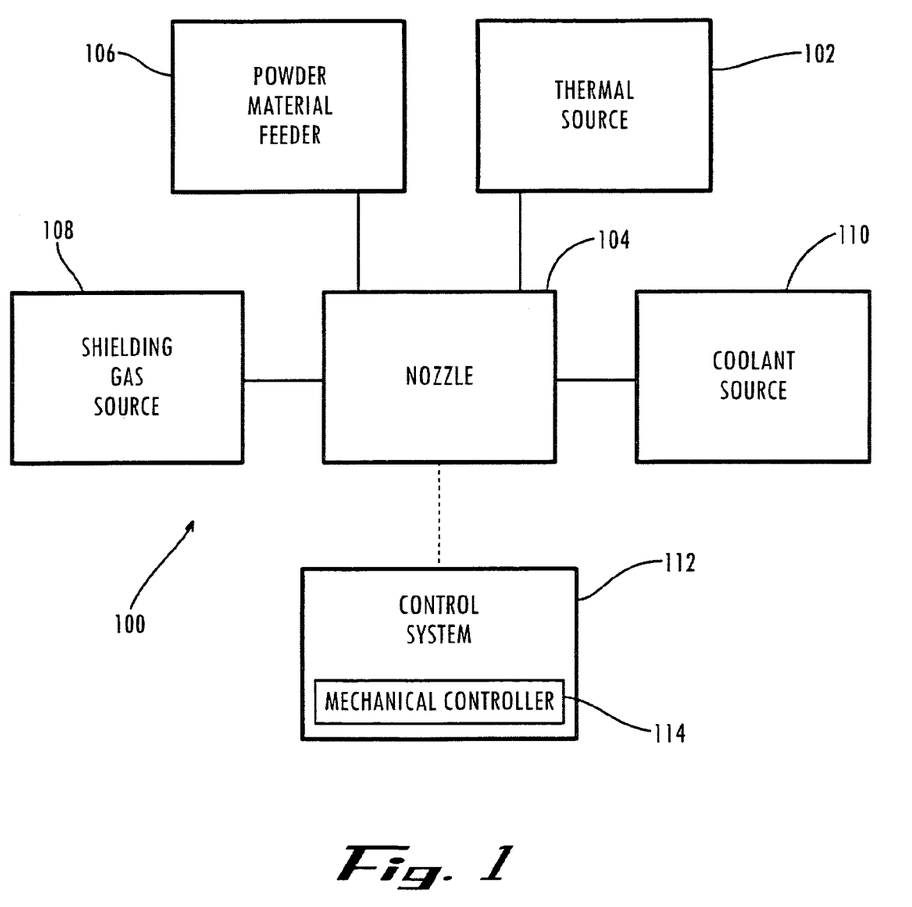
FIG. 1 is a block diagram illustrating an example laser net shape manufacturing system, in accordance with one or more embodiments.

Referring to FIG. 1, a block diagram illustrates a laser net shape manufacturing system 100 according to one or more embodiments. Laser net shape manufacturing system 100 may include more components than those shown in FIG. 1. However, generally conventional components may not be shown. Illustrated in FIG. 1, laser net shape manufacturing system 100 may include a thermal source 102. Thermal source 102 may be any suitable thermal device adapted to produce thermal energy, according to the particular application. Examples of suitable thermal sources 102 may include, but are not limited to a coherent laser source, an electron beam source, an ion beam source, or an arc welding torch (such as a Gas Tungsten Arc Welding (GTAW) torch), or the like, although the scope of the claimed subject matter is not limited in this respect. Thermal source 102 may be operatively associated with a nozzle 104 to supply thermal energy through the nozzle 104. Various aspects of nozzle 104 will be discussed in greater detail below.

Laser net shape manufacturing system 100 may further comprise a powder material feeder 106. Powder material feeder 106 may be operatively associated with nozzle 104 to supply the nozzle 104 with powder material. Powder material feeder 106 may be any suitable device adapted to supply the nozzle 104 with powder material, according to the particular application.

Laser net shape manufacturing system 100 may further comprise a shielding gas source 108. Shielding gas source 108 may be operatively associated with nozzle 104 to supply the nozzle 104 with shielding gas. Shielding gas source 108 may be any suitable device adapted to supply the nozzle 104 with shielding gas, according to the particular application.

Additionally, shielding gas source 108 may include any suitable shielding gas, according to the particular application. Examples of a suitable shielding gas may include, but are not limited to Argon gas, or the like, although the scope of the claimed subject matter is not limited in this respect.

Laser net shape manufacturing system 100 may further comprise a coolant source 110. Coolant source 110 may be operatively associated with nozzle 104 to supply the nozzle 104 with coolant fluid. Coolant source 110 may be any suitable device adapted to supply the nozzle 104 with coolant fluid, according to the particular application. Additionally, coolant source 110 may include any suitable coolant, according to the particular application. Examples of a suitable coolant may include, but are not limited to water with room temperature or lower temperature, or the like, although the scope of the claimed subject matter is not limited in this respect.

Laser net shape manufacturing system 100 may further comprise a control system 112. Control system 112 may include a mechanical controller 114 that may be operatively associated with nozzle 104 to change the spatial orientation between the nozzle 104 and any substrate on which the laser net shape manufacturing is to occur. Mechanical controller 114 may be any suitable device adapted to change the spatial orientation between the nozzle 104 and any substrate on which the laser net shape manufacturing is to occur, according to the particular application. Examples of mechanical controllers 114 may include, but are not limited to a Computer Numerical Control (CNC) machine, or the like, although the scope of the claimed subject matter is not limited in this respect.

Figure 2:
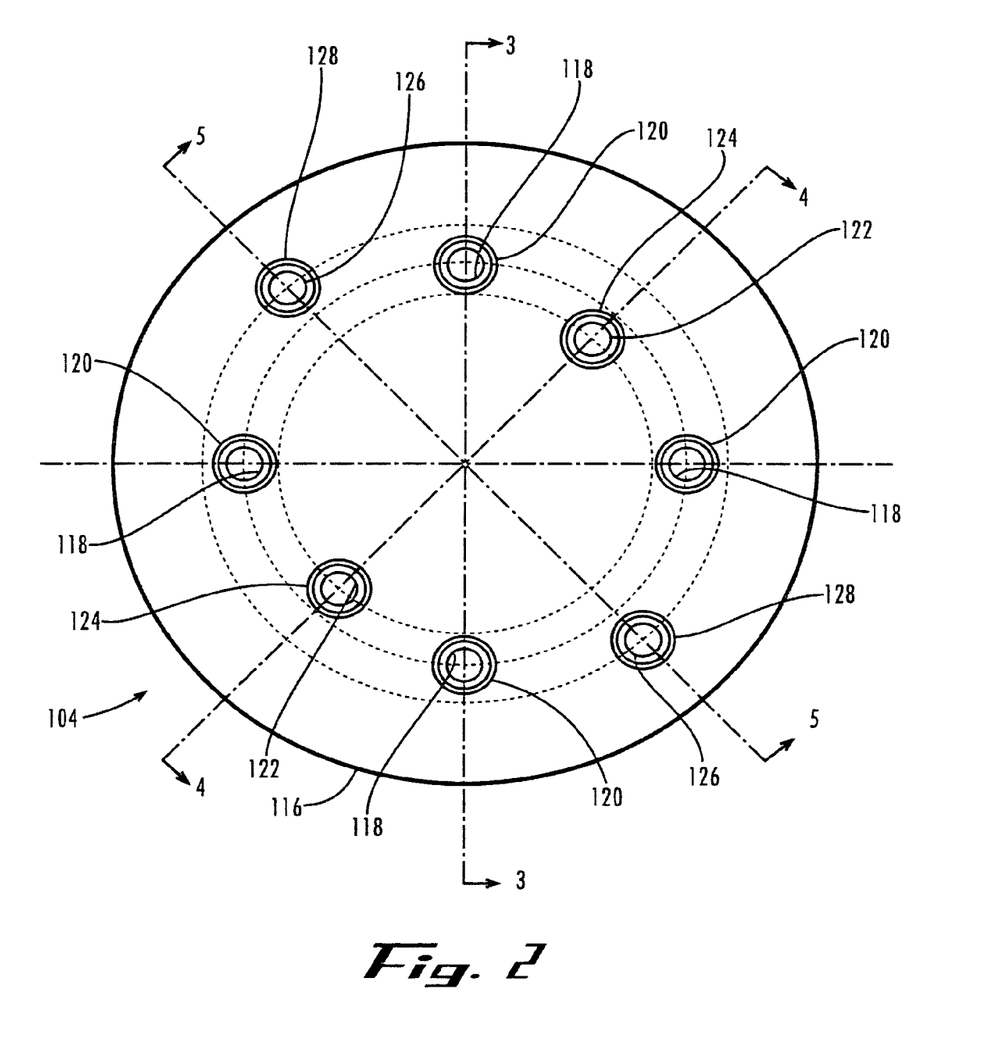
FIG. 2 is a top view illustrating an example nozzle, in accordance with one or more embodiments.

Referring now to FIG. 2, there is illustrated an example nozzle 104, in accordance with one or more embodiments. Nozzle 104 may include a main body 116. One or more conducting inlet apertures 118 may be located on main body 116 and adapted to receive powder material from powder material feeder 106, for example as shown in FIG. 1. A conducting inlet fastener 120 may be provided for one or more of the conducting inlet apertures 118. Conducting inlet fastener 120 may be any suitable device adapted to fasten with a portion of the powder material feeder 106, for example as shown in FIG. 1, according to the particular application. Examples of conducting inlet fasteners 120 may include, but are not limited to a fast equipped connector, or the like, although the scope of the claimed subject matter is not limited in this respect.

One or more shielding gas inlet apertures 122 may be located on main body 116 and adapted to receive shielding gas from shielding gas source 108, for example as shown in FIG. 1. A shielding gas inlet fastener 124 may be provided for one or more of the shielding gas inlet apertures 122. Shielding gas inlet fastener 124 may be any suitable device adapted to fasten with a portion of the shielding gas source 108, for example as shown in FIG. 1 according to the particular application. Examples of shielding gas inlet fasteners 124 may include, but are not limited to a fast equipped connector, or the like, although the scope of the claimed subject matter is not limited in this respect.

One or more coolant apertures 126 may be located on main body 116 and adapted to receive coolant from coolant source 110, for example as shown in FIG. 1. A coolant fastener 128 may be provided for one or more of the coolant apertures 126. Coolant fastener 128 may be any suitable device adapted to fasten with a portion of the coolant source 110, for example as shown in FIG. 1, according to the particular application. Examples of coolant fasteners 128 may include, but are not limited to a fast equipped connector, or the like, although the scope of the claimed subject matter is not limited in this respect.

Figure 3:
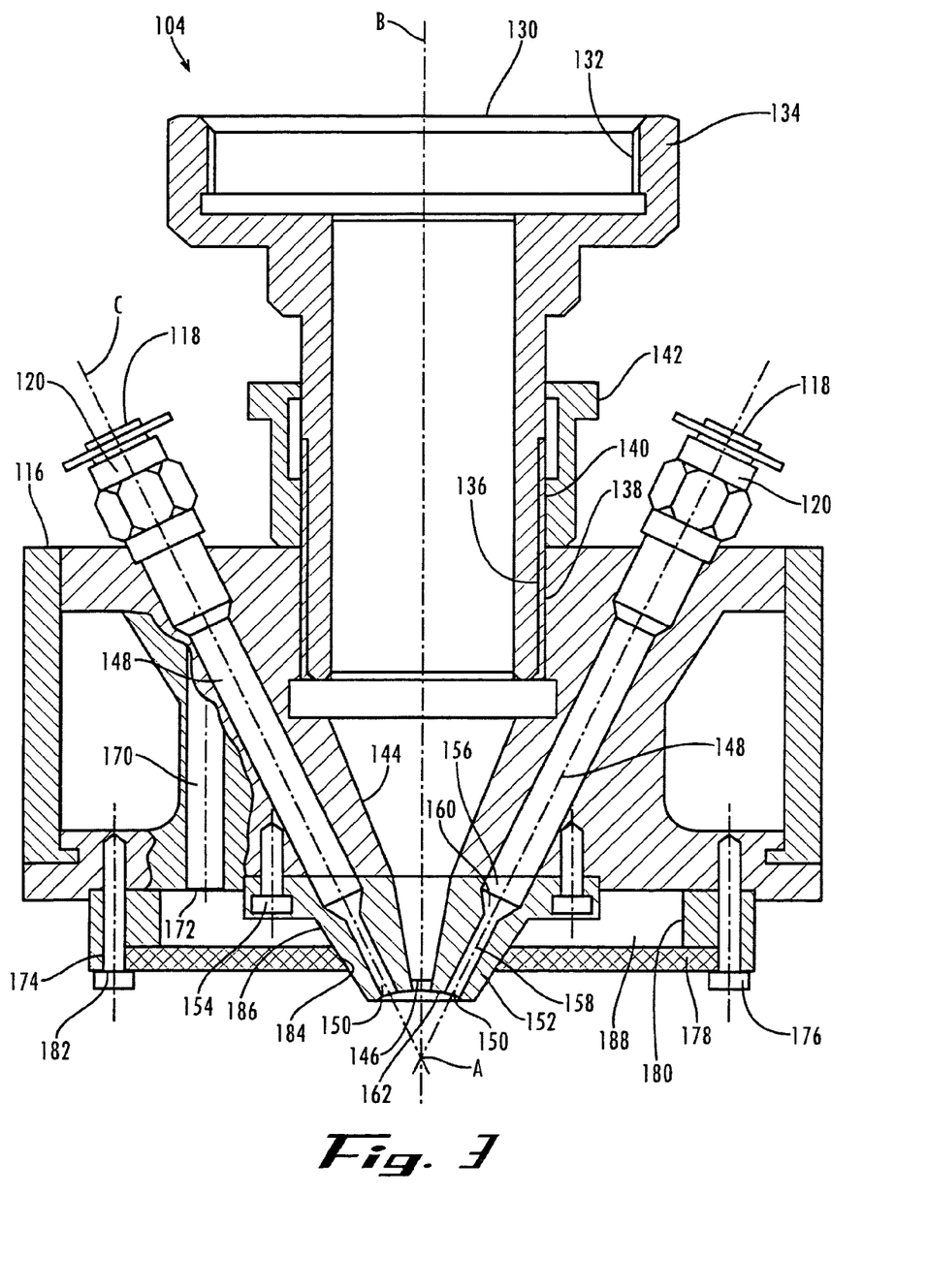
FIG. 3 is a cross sectional view illustrating an example nozzle taken along line 3-3 of FIG. 2, in accordance with one or more embodiments.

Referring now to FIG. 3, there is illustrated an example nozzle 104, in accordance with one or more embodiments. A thermal inlet aperture 130 may be associated with the main body 116 and adapted to receive thermal energy from thermal source 102, for example as shown in FIG. 1. A thermal inlet fastener 132 may be provided for the thermal inlet aperture 130. Thermal inlet fastener 132 may be any suitable device adapted to fasten with a portion of the thermal source 102, for example as shown in FIG. 1, according to the particular application. Thermal inlet aperture 130 may be associated with the main body 116 at least via a connector body 134. Connector body 134 may include a first surface 136 adapted to mate with a corresponding second surface 138 located on the main body 116. If the relative distance between connector body 134 and main body 116 is adjusted via first surface 136 and second surface 138, different focus characteristics may be obtained. A third surface 140 located on a lock piece 142 may also mate with the first surface 136 of the connector body 134. If the lock piece 142 is tightened on connector body 134, the lock piece 142 may operate to restrict the connector body 134 from moving with respect to the main body 116.

A thermal channel 144 may be located at least partially within the main body 116. The thermal channel 144 may comprise a thermal outlet aperture 146, in communication with the thermal inlet aperture 130, capable of passing thermal energy therethrough.

One or more conducting channels 148 may be located at least partially within the main body 116. The one or more conducting channels 148 may have substantially identical diameter and leaning angle. Conducting channel 148 may comprise at least one conducting outlet aperture 150, in communication with the conducting inlet aperture 118, capable of dispersing powder material therethrough. Conducting outlet aperture 150 may be located adjacent the thermal outlet aperture 146. Conducting outlet aperture 150 may be a single point outlet aperture. Where four conducting channels 148 may be located at least partially within the main body 116, the four conducting channels 148 may be symmetrically distributed and spaced in opposing pairs. In operation, the one or more conducting channels 148 may provide one or more powder material streams joined at one point A on the convergence of a centerline B of the thermal channel 144 and a centerline C of the one or more conducting channels 148. In operation, the point A may be the position of a melting pool of material and/or the interaction position for thermal energy and powder material.

A first conducting head 152 may be connected to the main body 116. One or more conducting head fasteners 154 may connect the first conducting head 152 to the main body 116. Conducting head fasteners 154 may be any suitable device adapted to connect the first conducting head 152 to the main body 116, according to the particular application. Examples of conducting head fasteners 154 may include, but are not limited to a screw, or the like, although the scope of the claimed subject matter is not limited in this respect.

First conducting head 152 may contain the conducting outlet aperture 150 and may contain at least a portion of the one or more of the conducting channels 148. Conducting channels 148 may include a large diameter portion 156 located adjacent the conducting inlet aperture 118, a small diameter portion 158 located adjacent the conducting outlet aperture 118, and a transitional portion 160 located between the large diameter portion 156 and the small diameter portion 158. Transitional portion 160 may have a frustoconical type shape, or other suitable shape, tapering from the large diameter portion 156 to the small diameter portion 158. The diameter and length of the one or more of the conducting channels 148 may be set to be suitable to prevent the powder material from scattering immediately when the powder material exits the one or more of the conducting channels 148, according to the particular application. In operation, the first conducting head 152 may be capable of dispersing powder material in a first dispersing path for use in laser net shape manufacturing. For example, the shape, dimension, and/or orientation of the portion of conducting channel 158 located within the first conducting head 152 may result in a given first dispersing path of powder material.

A recess portion 162 may be located in the first conducting head 152 on an outer surface of the nozzle 104. One or more of the conducting outlet apertures 150 of the conducting channels 148 may be located on the recess portion 162. Additionally or alternatively, the thermal outlet aperture 146 may be located on the recess portion 162. The recess portion 162 may have a generally concave shape. In operation, the recess portion 162 may be capable of decreasing the probability of powder material blocking in the one or more of the conducting channels 148.

Figure 4:
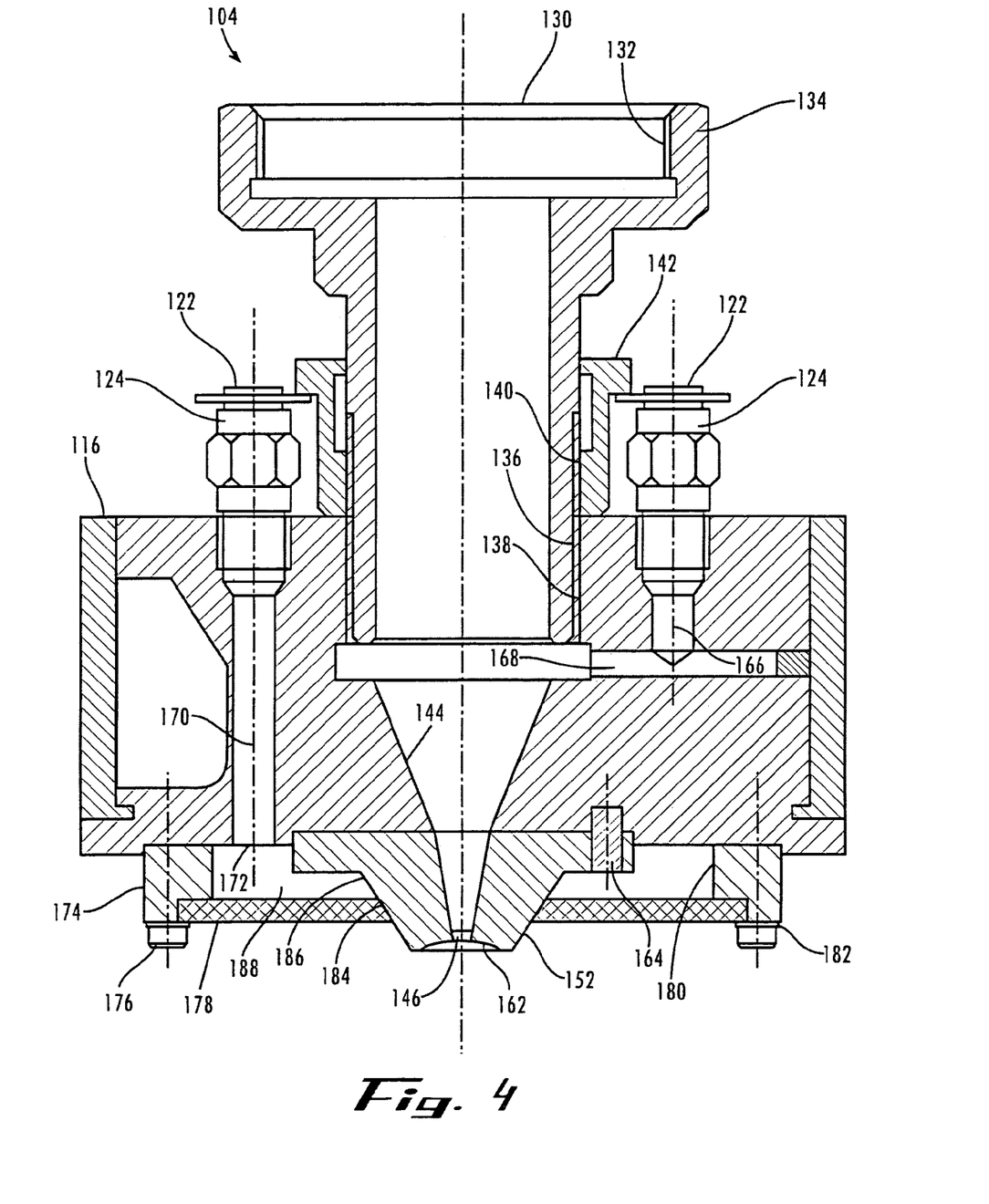
FIG. 4 is a cross sectional view illustrating an example nozzle taken along line 4-4 of FIG. 2, in accordance with one or more embodiments.

Referring now to FIG. 4, there is illustrated an example nozzle 104, in accordance with one or more embodiments. Nozzle 104 may include a pin 164 associated between the main body 116 and the first conducting head 152. Pin 164 may be capable of aligning the corresponding portions of the one or more of the conducting channels 148 located in both the main body 116 and the first conducting head 152.

A center shielding gas channel 166 may be located in the main body 116. Center shielding gas channel 166 may extend from at least one of the shielding gas inlet apertures 122 to a center shielding gas outlet aperture 168. Center shielding gas outlet aperture 168 may be located to open into the thermal channel 144. In operation, shielding gas may be transferred from the shielding gas source 108, for example as shown in FIG. 1, to at least one of the shielding gas inlet apertures 122, through the center shielding gas channel 166, and into the thermal channel 144 via the center shielding gas outlet aperture 168. In operation, the shielding gas supplied to the thermal channel 144 exiting the thermal outlet aperture 146 may prevent damage to optics as well as to prevent blocking of the thermal outlet aperture 146 by rebounded heated powder material.

An exterior shielding gas channel 170 may be located in the main body 116. The exterior shielding gas channel 170 may extend from at least one of the shielding gas inlet apertures 122 to an exterior shielding gas outlet aperture 172. Exterior shielding gas outlet aperture 172 may be located to open to an outer surface of the main body 116 adjacent the first conducting head 152. In operation, shielding gas is transferred from the shielding gas source 108, for example as shown in FIG. 1, to at least one of the shielding gas inlet apertures 122, through the exterior shielding gas channel 170, and exiting the main body 116 via exterior shielding gas outlet aperture 172. In operation, the shielding gas exiting the main body 116 via exterior shielding gas outlet aperture 172 may prevent oxidation on a work piece.

Nozzle 104 may include a first gas distribution head 174 connected to the main body 116. One or more gas distribution head fasteners 176 may connect the first gas distribution head 174 to the main body 116. Gas distribution head fasteners 176 may be any suitable device adapted to connect the first gas distribution head 174 to the main body 116, according to the particular application. Examples of gas distribution head fasteners 176 may include, but are not limited to a screw, or the like, although the scope of the claimed subject matter is not limited in this respect.

First gas distribution head 174 may include a porous disk 178 positioned in spaced alignment with the main body 116. Porous disk 178 may be secured via the one or more gas distribution head fasteners 176 between a ring 180 located adjacent the main body 116 and a gasket 182. Porous disk 178 may include a center aperture 184 that abuts an outer surface 186 of the first conducting head 152.

The space between the porous disk 178 and the main body 116 may form a plenum 188 capable of receiving shielding gas exiting the exterior shielding gas outlet aperture 172. In operation, the first gas distribution head 174 may be capable of distributing shielding gas in a first distribution path surrounding the conducting outlet aperture 150 to protect a melting pool of thermally exited powder material as well as a work piece from oxidation. For example, the porous characteristics of the porous disk 178 may be capable of decreasing the flow speed of shielding gas exiting the exterior shielding gas outlet aperture 172 into plenum 188 and capable of creating a substantially homogeneous flow of shielding gas through the porous disk 178 in a first distribution path surrounding the one or more conducting outlet apertures 150, for example as shown in FIG. 3, located in first conducting head 152.

Figure 5:
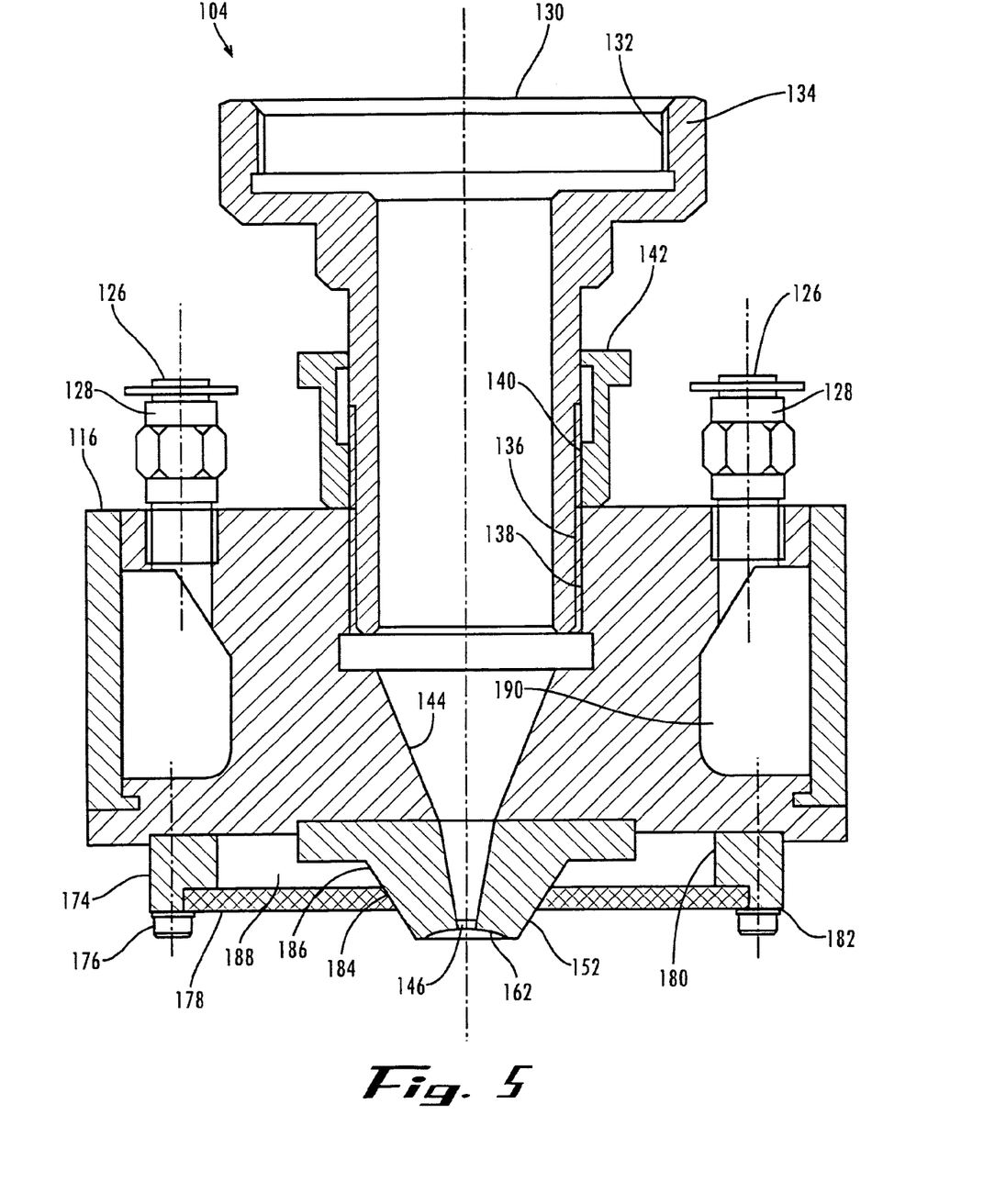
FIG. 5 is a cross sectional view illustrating an example nozzle taken along line 5-5 of FIG. 2, in accordance with one or more embodiments.

Referring now to FIG. 5, there is illustrated an example nozzle 104, in accordance with one or more embodiments. Nozzle 104 may include a coolant channel 190 located in the main body 116. Coolant channel 190 may be in communication with the one or more coolant apertures 126. Coolant channel 190 may be capable of receiving coolant from coolant source 110, for example as shown in FIG. 1, through one of the one or more coolant apertures 126, passing coolant through the main body 116, and releasing coolant back towards coolant source 110, for example as shown in FIG. 1, through one of the one or more coolant apertures 126. In operation, the coolant channel 190 may be capable of cooling the nozzle 104 by passing coolant therethrough in order to prevent and/or mitigate damage to the nozzle 104 due to overheating from reflected thermal energy.

Figure 6:
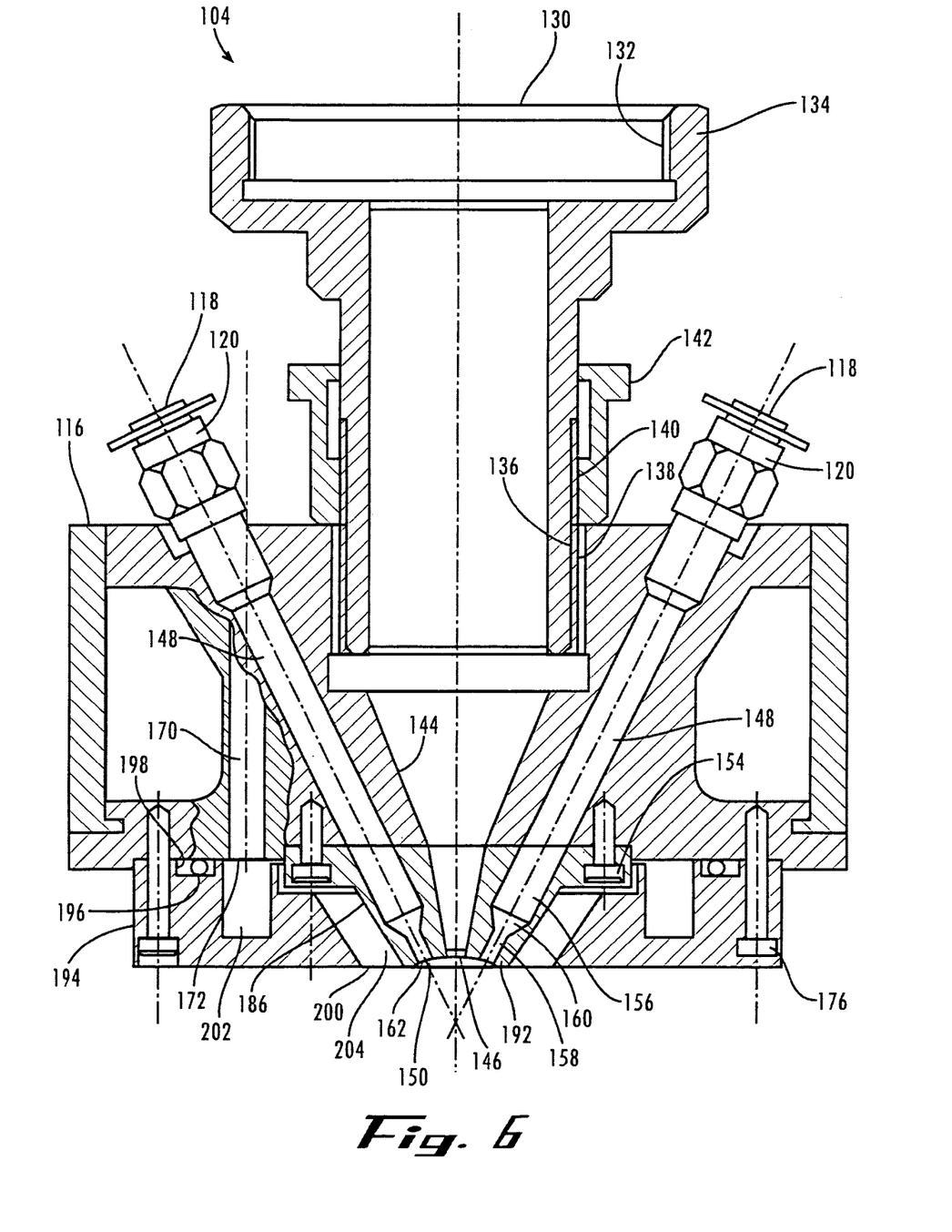
FIG. 6 is a cross sectional view illustrating an example nozzle taken along line 3-3 of FIG. 2, in accordance with one or more embodiments.

Referring now to FIG. 6, there is illustrated an example nozzle 104, in accordance with one or more embodiments. Nozzle 104 may include a second conducting head 192 connected to the main body 116. Second conducting head 192 and the first conducting head 152, for example as shown in FIG. 3, are capable of being interchangeably attached to the main body 116. Second conducting head 192 may contain the conducting outlet aperture 150 and at least a portion of the conducting channel 148. Second conducting head 192 may be capable of dispersing powder material in a second dispersing path different from the first dispersing path of the first conducting head 152, for example as shown in FIG. 3. For example, the shape, dimension, and/or orientation of the portion of conducting channel 158 located within the second conducting head 192 may vary from the shape, dimension, and/or orientation of the portion of conducting channel 158 located within the first conducting head 152, which may result in a second dispersing path different from the first dispersing path of the first conducting head 152, for example as shown in FIG. 3.

Nozzle 104 may include a second gas distribution head 194 connected to the main body 116. Second gas distribution head 194 and the first gas distribution head 174, for example as shown in FIG. 4, may be capable of being interchangeably attached to the main body 116. One or more gas distribution head fasteners 176 may connect the second gas distribution head 194 to the main body 116 and may secure a seal member 196 between the main body 116 and a trough 198 located on the second gas distribution head 194. Seal member 196 may be any suitable device adapted to seal between the second gas distribution head 194 and the main body 116, according to the particular application. Examples of seal members 196 may include, but are not limited to O shape rubber lock rings, or the like, although the scope of the claimed subject matter is not limited in this respect.

In operation, the second gas distribution head 194 may be capable of distributing shielding gas in a second distribution path encircling the conducting outlet aperture 150 different from the first distribution path of the first gas distribution head 174, for example as shown in FIG. 4. For example, second gas distribution head 194 may include a shielding gas aperture 200 surrounding the outer surface 186 of the second conducting head 194, a groove 202 in communication with the exterior shielding gas aperture 172 of the main body 116, and a cone shaped conduit 204 in communication between the groove 202 and the shielding gas aperture 200. Groove 202 may have a ring like shape encircling the conducting outlet aperture 150 capable of creating a substantially homogeneous flow of shielding gas through the second gas distribution head 194. Cone shaped conduit 204 may be oriented and arranged to be capable of distributing shielding gas in a second distribution path having a generally conical shape. In operation, the second gas distribution head 194 may distribute shielding gas capable of protecting a melting pool of thermally exited powder material as well as a work piece from oxidation.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

What is claimed is:

1. An apparatus, comprising:
   a main body;
   a thermal channel located at least partially within the main body, wherein the thermal channel comprises a thermal outlet aperture capable of passing thermal energy therethrough;
   a conducting channel located at least partially within the main body, wherein the conducting channel comprises at least one conducting outlet aperture located adjacent the thermal outlet aperture, and wherein the conducting outlet aperture is a single point outlet aperture capable of dispersing powder material therethough; and
   a first gas distribution head comprising a porous disk having a center aperture though which the conducting channel passes and capable of distributing shielding gas though the porous disk in a first distribution path surrounding the conducting outlet aperture.

2. The apparatus of claim 1, further comprising a first conducting head containing the conducting outlet aperture and at least a portion of the conducting channel, wherein the first conducting head is capable of dispersing powder material in a first dispersing path.

3. The apparatus of claim 2, further comprising a recess portion located in the first conducting head, wherein the at least one conducting outlet aperture is located on said recess portion.

4. The apparatus of claim 3, wherein the thermal outlet aperture is located on said recess portion, and wherein the recess portion has a generally concave shape.

5. The apparatus of claim 2, further comprising a second conducting head containing the conducting outlet aperture and at least a portion of the conducting channel, wherein the second conducting head is capable of dispersing powder material in a second dispersing path different from the first dispersing path, and wherein the second conducting head and the first conducting head are interchangeably attachable to the main body.

6. The apparatus of claim 1, wherein the thermal energy comprises energy from one or more of the following: a laser source, an electron beam source, an ion beam source, or an arc welding torch, or combinations thereof.

7. The apparatus of claim 1, further comprising a second gas distribution head capable of distributing shielding gas in a second distribution path surrounding the conducting outlet aperture different from the first distribution path, and wherein the first gas distribution head and the second gas distribution head are interchangeably attachable to the main body.

8. An apparatus, comprising:
   a main body;
   a conducting channel located at least partially within the main body, wherein the conducting channel comprises at least one conducting outlet aperture capable of passing powder material therethrough;
   a first conducting head containing the conducting outlet aperture and at least a portion of the conducting channel, wherein the first conducting head is capable of dispersing powder material in a first dispersing path;
   a recess portion located in the first conducting head, wherein the at least one conducting outlet aperture is located on said recess portion; and
   a first gas distribution head comprising a porous disk having a center aperture though which the conducting channel passes and capable of distributing shielding gas though the porous disk in a first distribution path surrounding the conducting outlet aperture.

9. The apparatus of claim 8, further comprising a second gas distribution head capable of distributing shielding gas in a second distribution path surrounding the conducting outlet aperture different from the first distribution path, and wherein the first gas distribution head and the second gas distribution head are interchangeably attachable to the main body.

10. The apparatus of claim 8, further comprising a thermal channel located at least partially within the main body, wherein the thermal channel comprises a thermal outlet aperture capable of passing thermal energy therethrough; and wherein the conducting channel is located adjacent the thermal outlet aperture.

11. The apparatus of claim 10, wherein the thermal outlet aperture is located on said recess portion, and wherein the recess portion has a generally concave shape.

12. The apparatus of claim 10, wherein the thermal energy comprises energy from one or more of the following: a laser source, an electron beam source, an ion beam source, or an arc welding torch, or combinations thereof.

13. The apparatus of claim 8, further comprising a second conducting head containing the conducting outlet aperture and at least a portion of the conducting channel, wherein the second conducting head is capable of dispersing powder material in a second dispersing path different from the first dispersing path, and wherein the second conducting head and the first conducting head are interchangeably attachable to the main body.

14. An apparatus, comprising:
a main body;
a conducting channel located at least partially within the main body, wherein the conducting channel comprises at least one conducting outlet aperture capable of passing powder material therethrough;
a first conducting head containing the conducting outlet aperture and at least a portion of the conducting channel, wherein the first conducting head is capable of dispersing powder material in a first dispersing path;
a second conducting head containing the conducting outlet aperture and at least a portion of the conducting channel, wherein the second conducting head is capable of dispersing powder material in a second dispersing path different from the first dispersing path, and wherein the second conducting head and the first conducting head are interchangeably attachable to the main body; and
a first gas distribution head comprising a porous disk having a center aperture though which the conducting channel passes and capable of distributing shielding gas though the porous disk in a first distribution path surrounding the conducting outlet aperture.

15. The apparatus of claim 14, further comprising a thermal channel located at least partially within the main body, wherein the thermal channel comprises a thermal outlet aperture capable of passing thermal energy therethrough; and wherein the conducting channel is located adjacent the thermal outlet aperture.

16. The apparatus of claim 14, further comprising a second gas distribution head capable of distributing shielding gas in a second distribution path surrounding the conducting outlet aperture different from the first distribution path, and wherein the first gas distribution head and the second gas distribution head are interchangeably attachable to the main body.

17. The apparatus of claim 16, wherein the thermal energy comprises energy from one or more of the following: a laser source, an electron beam source, an ion beam source, or an arc welding torch, or combinations thereof.

18. An apparatus, comprising:
a main body;
a conducting channel located at least partially within the main body, wherein the conducting channel comprises at least one conducting outlet aperture capable of passing powder material therethough;
a first gas distribution head comprising a porous disk having a center aperture though which the conducting channel passes and capable of distributing shielding gas though the porous disk in a first distribution path surrounding the conducting outlet aperture; and
a second gas distribution head capable of distributing shielding gas in a second distribution path surrounding the conducting outlet aperture different from the first distribution path, and wherein the first gas distribution head and the second gas distribution head are interchangeably attachable to the main body.

19. The apparatus of claim 18, further comprising a thermal channel located at least partially within the main body, wherein the thermal channel comprises a thermal outlet aperture capable of passing thermal energy therethrough; and wherein the conducting channel is located adjacent the thermal outlet aperture.

20. The apparatus of claim 19, wherein the thermal energy comprises energy from one or more of the following: a laser source, an electron beam source, an ion beam source, or an arc welding torch, or combinations thereof.

21. A system, comprising:
a thermal source;
a powder material feeder;
a coolant source;
a shielding gas source; and
a nozzle operatively associated with the thermal source, the powder material feeder, the coolant source, and the shielding gas source, the nozzle comprising:
a main body,
a thermal channel located at least partially within the main body, wherein the thermal channel comprises a thermal outlet aperture capable of passing thermal energy therethrough, and
a conducting channel located at least partially within the main body, wherein the conducting channel comprises at least one conducting outlet aperture located adjacent the thermal outlet aperture, and wherein the conducting outlet aperture is a single point outlet aperture capable of dispersing powder material therethough; and
a first gas distribution head comprising a porous disk having a center aperture though which the conducting channel passes and capable of distributing shielding gas though the porous disk in a first distribution path surrounding the conducting outlet aperture.

22. The system of claim 21, further comprising a first conducting head containing the conducting outlet aperture and at least a portion of the conducting channel, wherein the first conducting head is capable of dispersing powder material in a first dispersing path.

23. The system of claim 22, further comprising a recess portion located in the first conducting head, wherein the at least one conducting outlet aperture is located on said recess portion.

24. The system of claim 23, wherein the thermal outlet aperture is located on said recess portion, and wherein the recess portion has a generally concave shape.

25. The system of claim 22, further comprising a second conducting head containing the conducting outlet aperture and at least a portion of the conducting channel, wherein the second conducting head is capable of dispersing powder material in a second dispersing path different from the first dispersing path, and wherein the second conducting head and the first conducting head are interchangeably attachable to the main body.

26. The system of claim 21, further comprising a second gas distribution head capable of distributing shielding gas in a second distribution path surrounding the conducting outlet aperture different from the first distribution path, and wherein the first gas distribution head and the second gas distribution head are interchangeably attachable to the main body.

27. The system of claim 21, wherein the thermal source comprises one or more of the following: a laser source, an electron beam source, an ion beam source, or an arc welding torch, or combinations thereof.

28. A method, comprising:
directing thermal energy towards a substrate;
dispersing powder material from at least two single point outlet apertures directed towards the thermal energy;

depositing the powder material onto the substrate; and distributing shielding gas using a first gas distribution head comprising a porous disk in an annular distribution path surrounding the at least two single point outlet apertures.

29. The method of claim 28, further comprising using energy from one or more of the following: a laser source, a an electron beam source, an ion beam source, or an arc welding torch, or combinations thereof, to supply at least a portion of the thermal energy.

30. The method of claim 28, wherein said at least two single point outlet apertures comprise four single point outlet apertures.

31. The method of claim 28, wherein said depositing the powder material onto the substrate comprises laser cladding or laser consolidation.

32. The method of claim 28, wherein both said directing of thermal energy towards a substrate and said dispersing of powder material from at least two single point outlet apertures are performed via a single nozzle.

* * * * *